US010663747B2

(12) United States Patent
Lee et al.

(10) Patent No.: US 10,663,747 B2
(45) Date of Patent: *May 26, 2020

(54) RAMAN DESPECKLING WITH SPECTRAL CONTROL

(71) Applicant: Projection Ventures, Inc., San Diego, CA (US)

(72) Inventors: Ian Lee, Chester, NH (US); Barret Lippey, Belmont, MA (US); John Amsten, Manchester-by-the-Sea, MA (US)

(73) Assignee: Projection Ventures, Inc., San Diego, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 15/357,320

(22) Filed: Nov. 21, 2016

(65) Prior Publication Data

US 2017/0068107 A1 Mar. 9, 2017

Related U.S. Application Data

(63) Continuation of application No. 14/259,474, filed on Apr. 23, 2014, now Pat. No. 9,529,202.

(51) Int. Cl.
*G02B 27/48* (2006.01)
*G02F 1/35* (2006.01)
(Continued)

(52) U.S. Cl.
CPC .......... *G02B 27/48* (2013.01); *G02B 27/102* (2013.01); *G02F 1/353* (2013.01); *G03B 21/005* (2013.01);
(Continued)

(58) Field of Classification Search
CPC ....... G02B 27/102; G02B 27/48; G02F 1/353; G03B 21/005; G03B 21/2013;
(Continued)

(56) References Cited

U.S. PATENT DOCUMENTS 5,274,494 A 12/1993 Rafanelli et al.
9,529,202 B2 * 12/2016 Lee ...................... H04N 9/3155
(Continued)

OTHER PUBLICATIONS

Mildren et al., Efficient, All-Solid-State, Raman Laser in the Yellow, Orange and Red, Optics Express, Mar. 8, 2004, pp. 785-790, vol. 12, No. 5, Optical Society of America, US.
(Continued)

*Primary Examiner* — Cara E Rakowski
*Assistant Examiner* — Magda Cruz
(74) *Attorney, Agent, or Firm* — Michael Best & Friedrich LLP

(57) ABSTRACT

An apparatus and method for controlling the spectrum of stimulated Raman scattering that is used for despeckling of digitally projected images. The stimulated Raman scattering is utilized to add wavelength diversity for reduced speckle and to change the color of the light to a more desirable combination of wavelengths. Digital projection with color-sequential projectors may be enabled by alternately switching the Raman spectrum between green and red. Improved projector transmission may be achieved by minimizing the amount of yellow light generated in the Raman spectrum.

18 Claims, 15 Drawing Sheets

(51) Int. Cl.
*G03B 21/20* (2006.01)
*G03B 21/00* (2006.01)
*G02B 27/10* (2006.01)
*H04N 9/31* (2006.01)
*H01S 3/23* (2006.01)
*H01S 3/108* (2006.01)
*G03B 33/10* (2006.01)
*H01S 3/00* (2006.01)

(52) U.S. Cl.
CPC .......... *G03B 21/20* (2013.01); *G03B 21/208* (2013.01); *G03B 21/2013* (2013.01); *G03B 21/2033* (2013.01); *G03B 33/10* (2013.01); *H01S 3/0092* (2013.01); *H01S 3/108* (2013.01); *H01S 3/2391* (2013.01); *H04N 9/3155* (2013.01); *H04N 9/3161* (2013.01)

(58) Field of Classification Search
CPC .............. G03B 21/2033; G03B 21/208; G03B 21/2093; G03B 33/10; H01S 3/0092; H01S 3/108; H01S 3/2391; H04N 13/0459; H04N 9/3155; H04N 9/3161
See application file for complete search history.

(56) References Cited

U.S. PATENT DOCUMENTS

| | | | |
|---|---|---|---|
| 2005/0225882 A1* | 10/2005 | Kwok | G02B 27/102 359/754 |
| 2011/0134510 A1* | 6/2011 | Lippey | G02B 27/48 359/327 |
| 2012/0140320 A1* | 6/2012 | Arntsen | G02B 27/2264 359/462 |
| 2012/0219021 A1* | 8/2012 | Lippey | H04N 9/3155 372/10 |
| 2013/0250401 A1* | 9/2013 | O'Hara | H01S 3/2383 359/327 |

OTHER PUBLICATIONS

Chiang, Kin S., Stimulated Raman Scattering in an Multimode Optical Fiber: Evolution of Modes in Stokes Waves, Optics Letters, Mar. 1, 1992, pp. 352-354, vol. 17, No. 5, Optical Society of American, US.

Antonelli et al., Raman Amplification in Multimode Fibers with Random Mode Coupling, Optics Letters, Apr. 2013, pp. 1188-1190, vol. 38, No. 8, Optical Society of America, US.

* cited by examiner

RAMAN DESPECKLING WITH SPECTRAL CONTROL

CROSS-REFERENCE TO RELATED APPLICATIONS

This application is a continuation of U.S. patent application Ser. No. 14/259,474, filed Apr. 23, 2014 (LLTE-0039-U01).

The above application is hereby incorporated by reference in its entirety.

BACKGROUND OF THE INVENTION

There are many advantages of using laser light sources to illuminate digital projection systems, but the high coherence of laser light tends to produce undesirable speckle in the viewed image. Known despeckling methods generally fall into the categories of polarization diversity, angle diversion, and wavelength diversity. In the laser projection industry, there has been a long-felt need for more effective despeckling methods.

SUMMARY OF THE INVENTION

In general, in one aspect, an optical apparatus that includes a pulsed green laser, a Raman-shifting device, and a digital projector. The pulsed green laser generates a green light with a light pulse that illuminates the Raman-shifting device. The light pulse is shaped in time to generate a desired spectrum from the Raman-shifting device, and the desired spectrum illuminates the digital projector.

Implementations may include one or more of the following features. The desired spectrum from the Raman-shifting device may have lower speckle than the pump green light. The desired spectrum may have a higher luminous efficacy than the pump green light. The light pulse may have a square-wave shape. The desired spectrum may be red. The light pulse may be shaped in time to alternate between a square shape of two different amplitudes. The desired spectrum may alternate between green light and red light. The digital projector may have a single light valve. The single light valve may form a full color digital image by synchronizing with a source of blue light and with the spectrum that alternates between green and red light. The desired spectrum may include a green band and a red band. The desired spectrum may have a gap between the green band and the red band. The gap may match a low transmission band of the digital projector.

In general, in one aspect, a method of despeckling that includes generating a pulsed green laser light, Raman-shifting the pulsed green laser light to generate a Raman-shifted laser light, using the Raman-shifted light to illuminate a digital projector, and projecting a digital image with the digital projector. The pulsed green laser light has a light pulse that is shaped in time to Raman-shift the laser light to a desired spectrum.

Implementations may include one or more of the following features. The desired spectrum from the Raman-shifting device may have lower speckle than the pump green light. The desired spectrum may have a higher luminous efficacy than the pump green light. The light pulse may have a square-wave shape. The desired spectrum may be red. The light pulse may be shaped in time to alternate between a square shape of a first amplitude and a square shape of two different amplitudes. The desired spectrum may alternate between green light and red light. The digital projector may have a single light valve. The single light valve may form a full color digital image by synchronizing with a source of blue light and with the spectrum that alternates between green and red light. The desired spectrum may include a green band and a red band. The desired spectrum may have a gap between the green band and the red band. The gap may match a low transmission band of the digital projector.

DETAILED DESCRIPTION

Conventional laser projection systems are typically constructed with narrow-band laser sources. The narrow bands of light tend to produce speckle patterns in the projected images. Spectral broadening of the laser sources may be used to add wavelength diversity that reduces the speckle characteristic. By using stimulated Raman scattering (SRS) in a potassium gadolinium tungstate (KGW) crystal, optical fiber, or other Raman-shifting device, additional Stokes-shifted peaks may be added to help reduce laser speckle with wavelength diversity.

Raman despeckling may be defined as the general method of adding Raman scattering light to increase the spectral diversity and therefore lower speckle. Raman scattered light is generated in peaks that typically have much larger bandwidth than the original laser light used to generate the Raman scattered light. Both additional peaks and larger bandwidth of each peak contribute to increased spectral diversity that reduces speckle. Control of the Raman spectrum is useful to achieve desired spectrums that enable specific system configurations for laser projectors or other goals such as improving performance by increasing brightness or meeting color points that are required for industry-specified color gamuts. The luminous efficacy (lumens per watt) of the light can also be increased in a controlled way by changing the spectrum with controlled Raman shifting.

Figure 1:
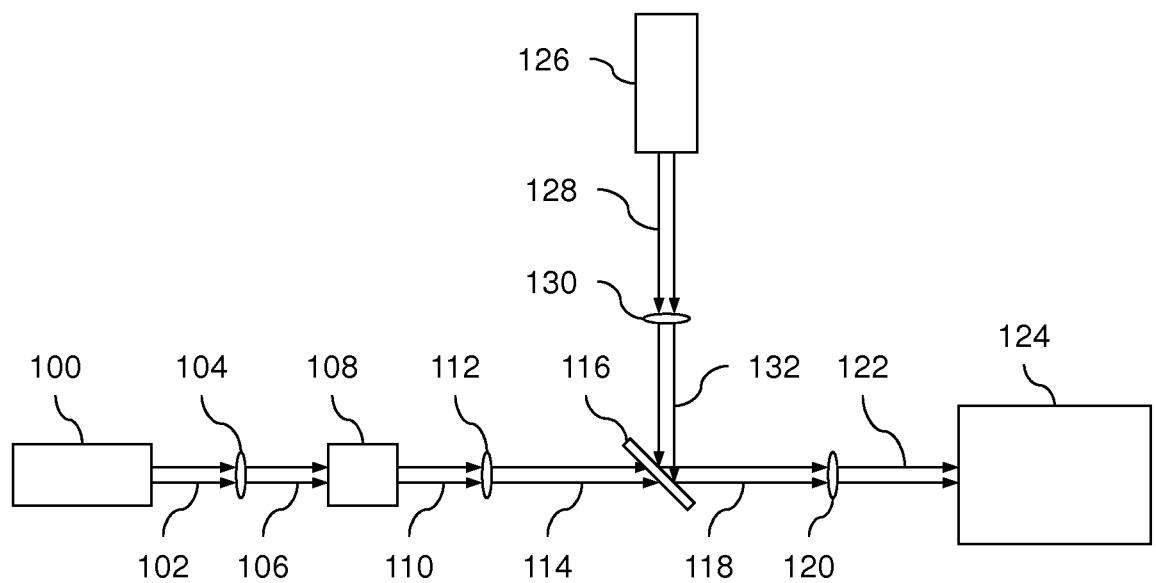
FIG. 1 is a top view of a laser projection system with spectral control of Raman despeckling.

FIG. 1 shows a top view of a laser projection system with spectral control of Raman despeckling. Green laser 100 generates first light beam 102. First light beam 102 illuminates first lens assembly 104. First lens assembly 104 produces second light beam 106. Second light beam 106 illuminates KGW crystal 108 and generates third light beam 110 which includes SRS light. Third light beam 110 illuminates second lens assembly 112. Second lens assembly 112 produces fourth light beam 114. Fourth light beam 114 transmits through beamsplitter 116 to form fifth light beam 118. Fifth light beam 118 illuminates third lens assembly 120. Third lens assembly 120 produces sixth light beam 122. Sixth light beam 122 illuminates digital projector 124. Blue laser 126 generates seventh light beam 128. Seventh light beam 128 illuminates fourth lens assembly 130. Fourth lens assembly 130 produces eighth light beam 132. Eighth light beam 132 reflects from beamplitter 116 to combine with fifth light beam 118. The number of passes through KGW crystal 108 may be modified to attain a longer or shorter path length as desired to convert more of less of the green laser light to SRS light. One pass through KGW crystal 108 is shown in FIG. 1, but any number of passes may be utilized. The lens assemblies may be any combination of lens or other optical elements that are designed to collect and shape the beam for optimal effect in each part of the system. KGW crystal 108 may alternately generate green and red light depending on the peak energy from green laser 100. If KGW crystal 108 is not used to generate red light, as separate red laser may be used with an additional beamsplitter. Digital projector 124 may be a projector based on digital micromirror (DMD), liquid crystal device (LCD), liquid crystal on silicon (LCOS), or other digital light valves. Additional elements may be included to further guide or despeckle the light such as additional lenses, diffusers, vibrators, or optical fibers.

Figure 2:
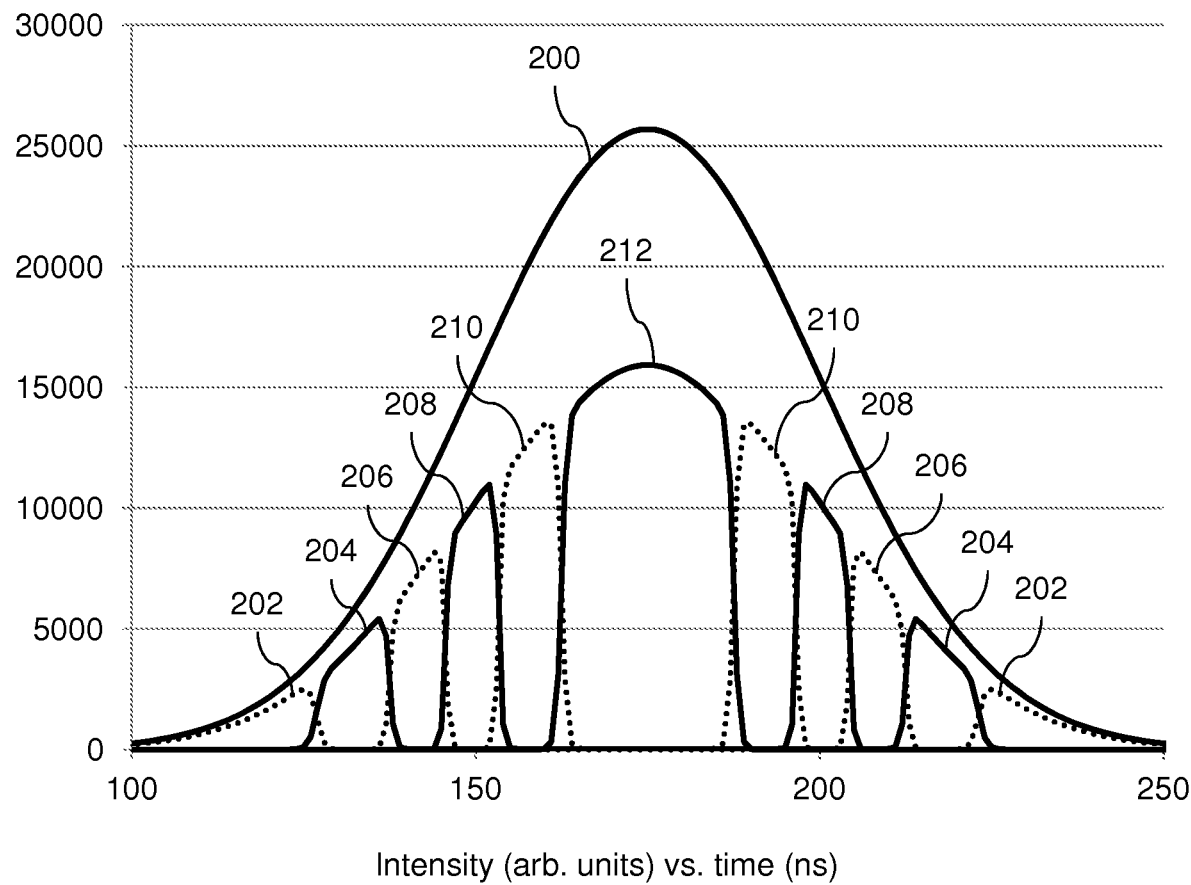
FIG. 2 is a computer-simulated time graph of stimulated Raman scattering from a Gaussian pulse in a KGW crystal.

FIG. 2 shows a computer-simulated time graph of SRS from a Gaussian pulse in a KGW crystal. A computer model was utilized to calculate the conversion properties of the KGW crystal with a pulsed laser beam pump that creates Raman gain in the crystal to produce Stokes-shifted peaks of SRS light. The model utilizes several parameters of the crystal and laser source to determine the Stokes-shifted peaks. For the example shown in FIG. 2, the Stokes shift was 768 $cm^{-1}$, the Raman gain cross section was $1.4 \times 10^{-12}$ mm/W, the average laser spot size in the crystal was 250 micrometers in diameter, the laser pulse energy was $1.8 \times 10^{-3}$ joules, the input pulse full-width half-maximum was 70 ns, the crystal physical length was 50 mm with 5 passes (total effective length of 250 mm), the spontaneous Raman seed power was $1 \times 10^{-7}$ W, the quantum defect level was 0.95, and the crystal transmission was 99.9% $cm^{-1}$. The input pulse to the KGW crystal was based on the output pulse from a green laser that has a Gaussian pulse shape. The x-axis represents time in nanoseconds, and the y-axis represents intensity in arbitrary units. First curve 200 shows the input pulse with Gaussian shape. Second curve 202 shows the residual energy that is not Stokes shifted. Third curve 204 shows the first Stokes-shifted peak. Fourth curve 206 shows the second Stokes-shifted peak. Fifth curve 208 shows the third Stokes-shifted peak. Sixth curve 210 shows the fourth Stokes-shifted peak. Seventh curve 212 shows the fifth Stokes-shifted peak. Overall, FIG. 2 describes the evolution in time of the SRS process.

Figure 3:
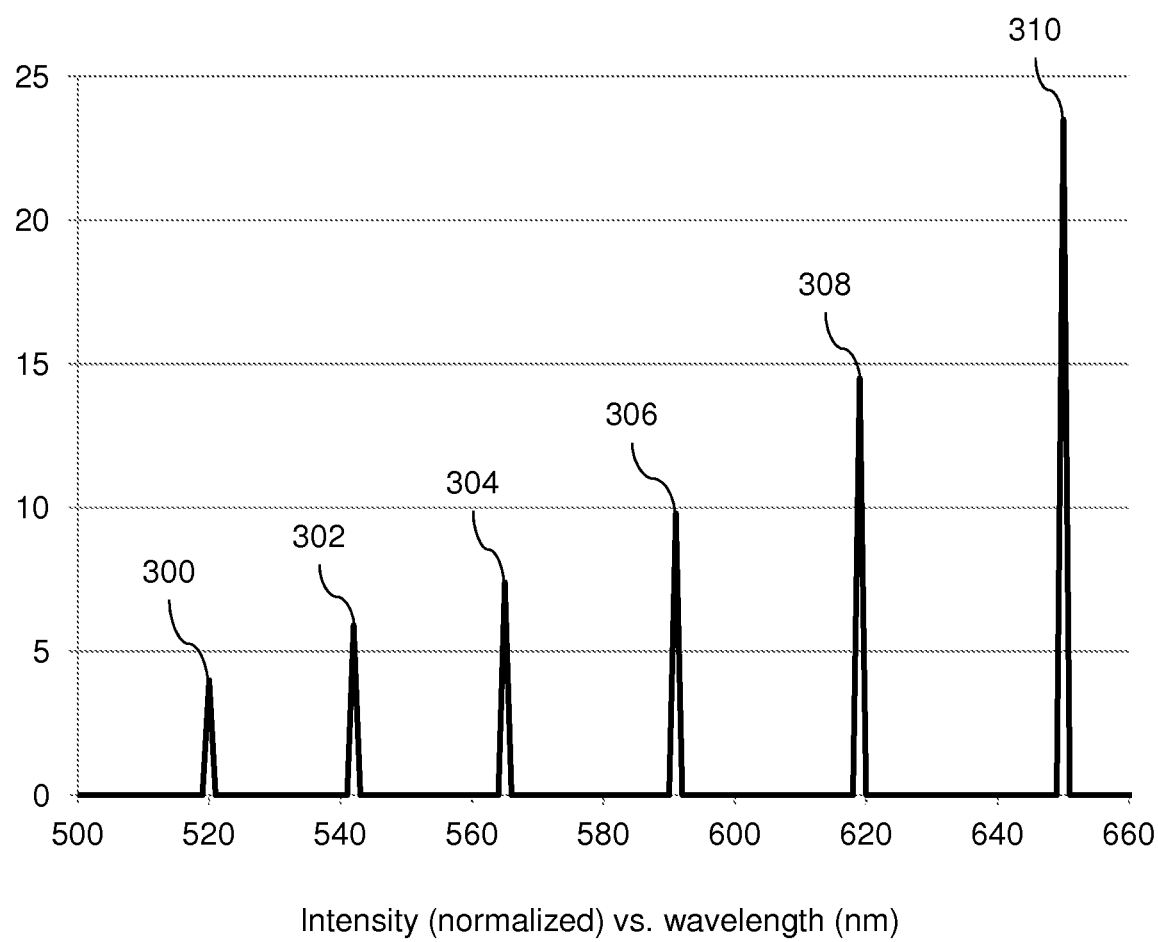
FIG. 3 is a computer-simulated spectral graph of stimulated Raman scattering from a Gaussian pulse in a KGW crystal.

The model used to generate FIG. 2 was used with the same parameters to generate FIG. 3 which shows a computer-simulated spectral graph of SRS from a Gaussian pulse in a KGW crystal. The horizontal axis represents wavelength in nanometers and the vertical axis represents normalized light intensity. First peak 300 shows an unshifted peak used to pump the crystal at 520 nm. Second peak 302 shows the first Stokes-shifted peak at 542 nm. Third peak 304 shows the second Stokes-shifted peak at 565 nm. Fourth peak 306 shows the third Stokes-shifted peak at 591 nm. Fifth peak 308 shows the fourth Stokes-shifted peak at 619 nm. Sixth peak 310 shows the fifth Stokes-shifted peak at 650 nm. Although not shown to scale in FIG. 3, first peak 300 is typically a very narrow peak that has a width of much less than one nanometer, whereas the other peaks typically have bandwidths in the range of 1 to 5 nm each because they are broadened by the SRS process. The overall envelope of the spectrum is gradually rising from the green to the red, so the Gaussian input pulse tends to generate more red than green.

Figure 4:
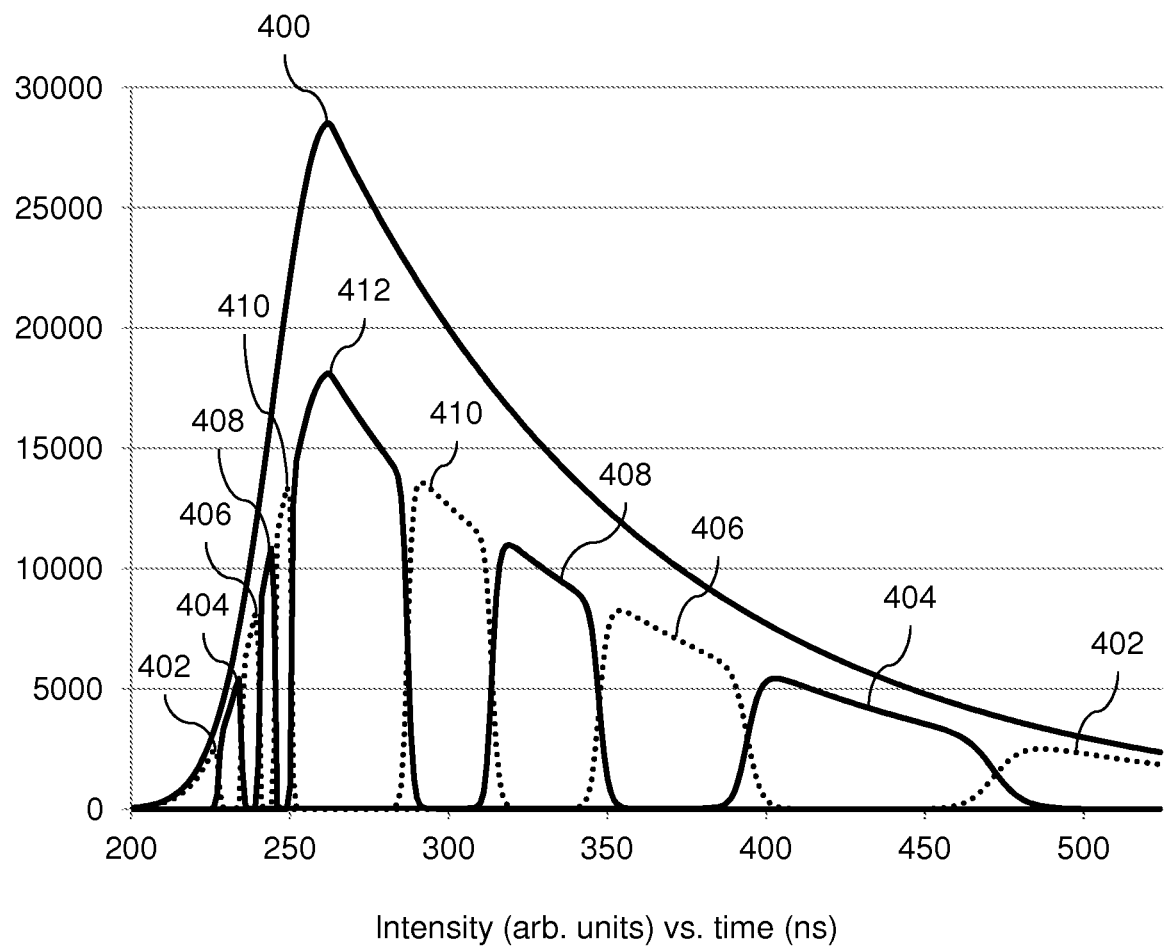
FIG. 4 is a computer-simulated time graph of stimulated Raman scattering from an exponential-decay pulse in a KGW crystal.

FIG. 4 shows a computer-simulated time graph of SRS from an exponential-decay pulse in a KGW crystal. The same computer model was utilized with the same parameters as for FIG. 2 except that the pulse shape was changed, the input pulse full-width half-maximum was 93 ns, and the laser pulse energy was $2 \times 10^{-3}$ joules. The x-axis represents time in nanoseconds, and the y-axis represents intensity in arbitrary units. First curve 400 shows the input pulse with a rapidly rising edge and exponential decay on the trailing edge. Second curve 402 shows the residual energy that is not Stokes shifted. Third curve 404 shows the first Stokes-shifted peak. Fourth curve 406 shows the second Stokes-shifted peak. Fifth curve 408 shows the third Stokes-shifted peak. Sixth curve 410 shows the fourth Stokes-shifted peak. Seventh curve 412 shows the fifth Stokes-shifted peak. Overall, FIG. 4 describes the evolution in time of the SRS process.

Figure 5:
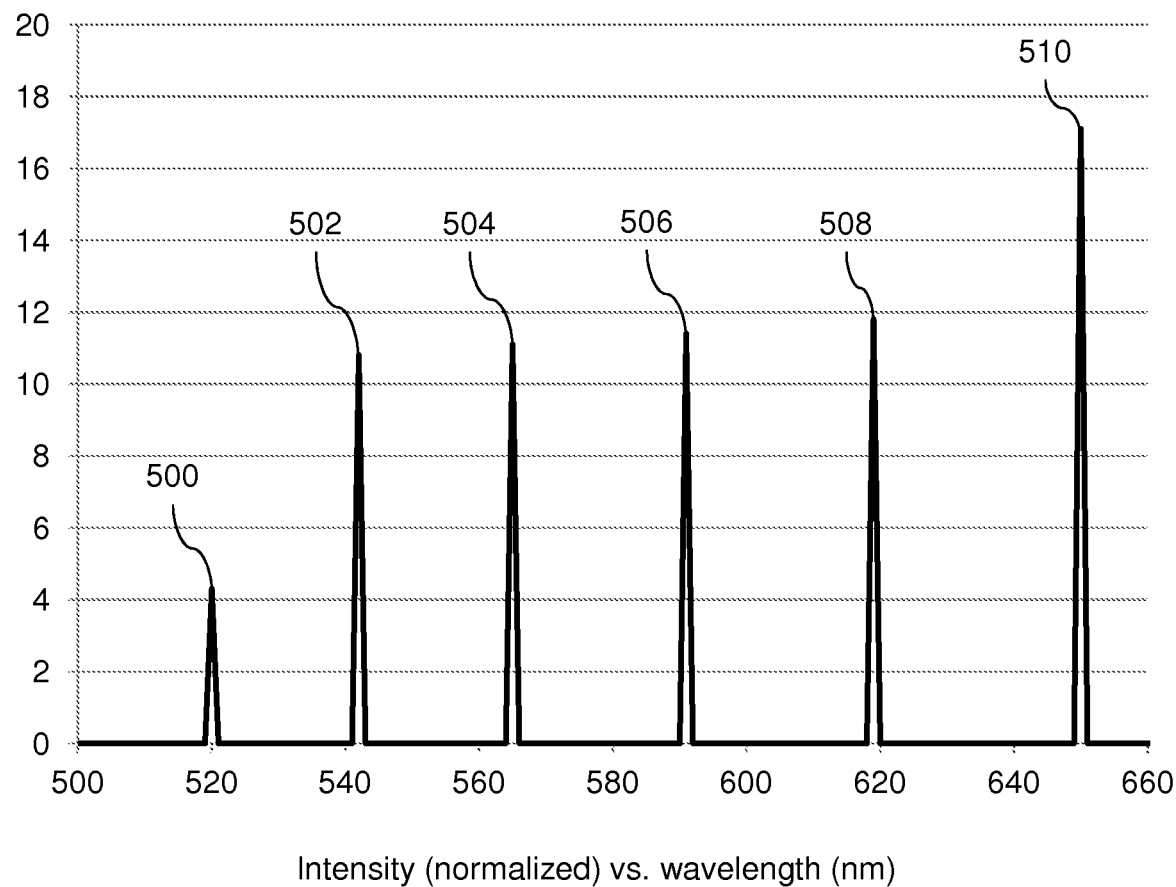
FIG. 5 is a computer-simulated spectral graph of stimulated Raman scattering from an exponential-decay pulse in a KGW crystal.

The model used to generate FIG. 4 was used with the same parameters to generate FIG. 5 which shows a computer-simulated spectral graph of SRS from an exponential-decay pulse in a KGW crystal. The horizontal axis represents wavelength in nanometers and the vertical axis represents normalized light intensity. First peak 500 shows an unshifted peak used to pump the crystal at 520 nm. Second peak 502 shows the first Stokes-shifted peak at 542 nm. Third peak 504 shows the second Stokes-shifted peak at 565 nm. Fourth peak 506 shows the third Stokes-shifted peak at 591 nm. Fifth peak 508 shows the fourth Stokes-shifted peak at 619 nm. Sixth peak 510 shows the fifth Stokes-shifted peak at 650 nm. Although not shown to scale in FIG. 3, first peak 500 is typically a very narrow peak that has a width of much less than one nanometer, whereas the other peaks typically have bandwidths in the range of 1 to 5 nm each because they are broadened by the SRS process. The overall envelope of the spectrum is flat in the middle of the spectrum, so the exponential-decay input pulse can be used to generate approximately equal amounts of green and red.

Figure 6:
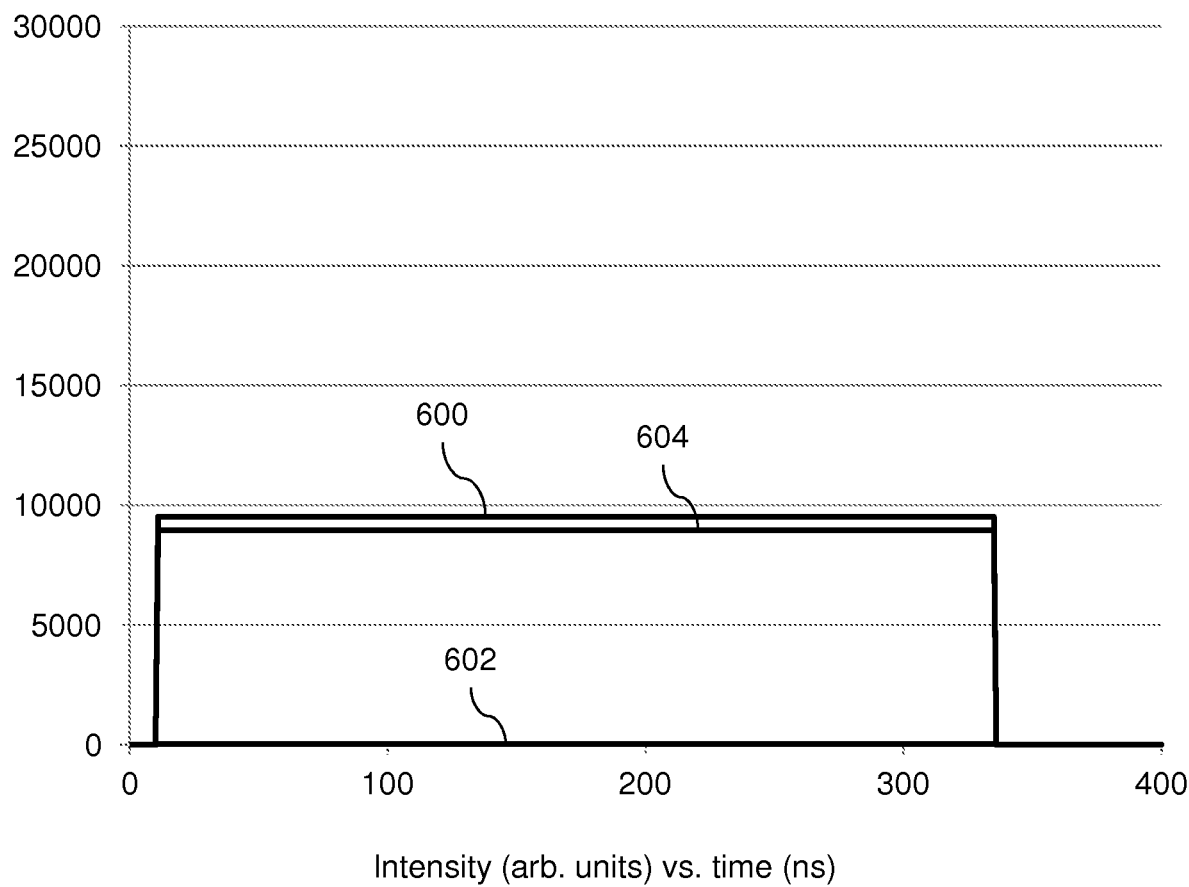
FIG. 6 is a computer-simulated time graph of stimulated Raman scattering from a square pulse generating green stimulated-Raman-scattering light in a KGW crystal.

FIG. 6 shows a computer-simulated time graph of SRS from a square pulse generating green SRS light in a KGW crystal. The same computer model was utilized with the same parameters as for FIG. 2 except that the pulse shape was changed, the input pulse full-width was 325 ns, and the laser pulse energy was $3.1 \times 10^{-3}$ joules. The x-axis represents time in nanoseconds, and the y-axis represents intensity in arbitrary units. First curve 600 shows the input pulse that has a square-wave shape. Second curve 602 shows a very small amount of residual energy that is not Stokes shifted. Third curve 604 shows the first Stokes-shifted peak. Overall, FIG. 6 describes the evolution in time of the SRS process.

Figure 7:
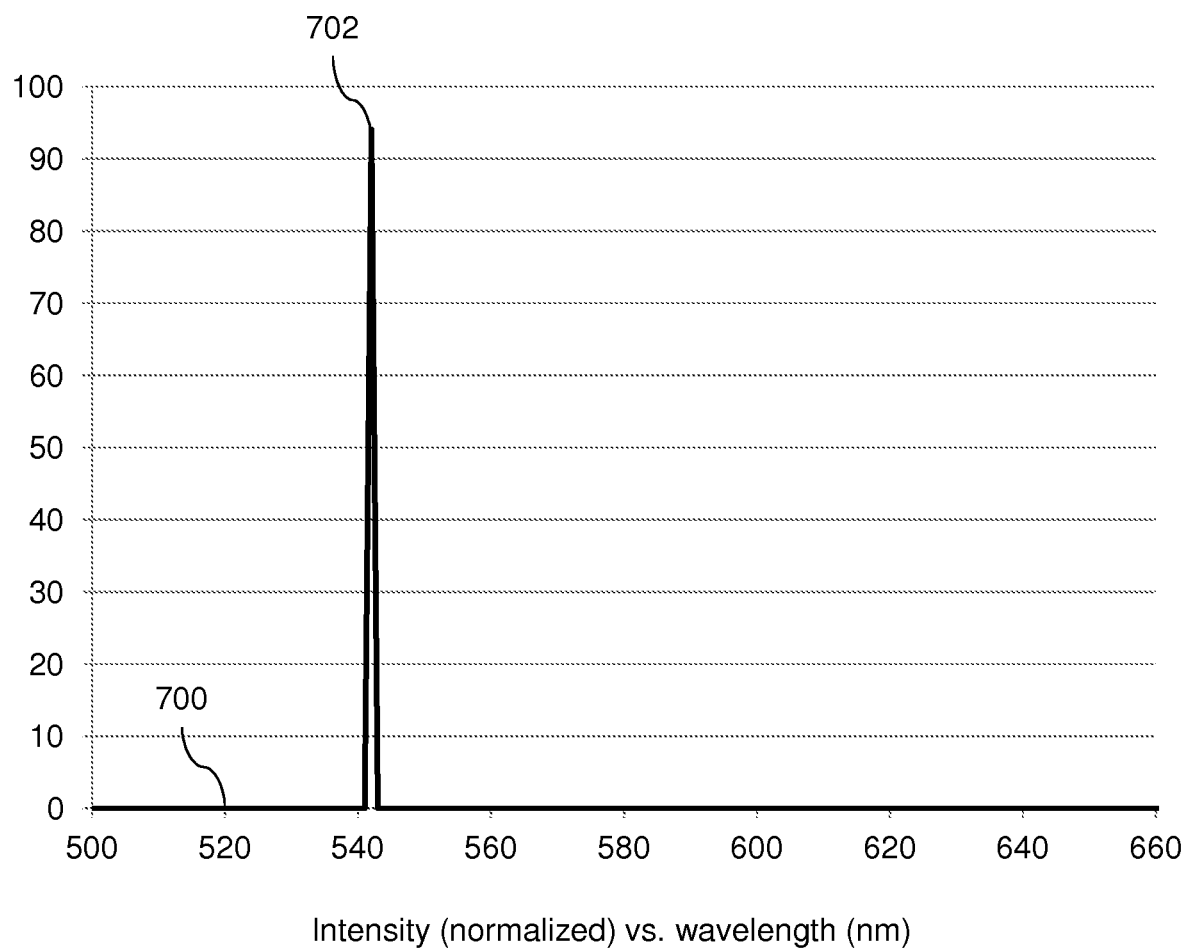
FIG. 7 is a computer-simulated spectral graph of stimulated Raman scattering from a square pulse generating green stimulated-Raman-scattering light in a KGW crystal.

The model used to generate FIG. 6 was used with the same parameters to generate FIG. 7 which shows a computer-simulated spectral graph of SRS from a square pulse generating green SRS light in a KGW crystal. The horizontal axis represents wavelength in nanometers and the vertical axis represents normalized light intensity. First peak 700 shows the spectral position of the pump light used to pump the crystal at 520 nm. Because the pump light is efficiently converted by the Raman process, the residual pump light is not visible as a peak in FIG. 7. Second peak 702 shows the first Stokes-shifted peak at 542 nm. Although not shown to scale in FIG. 7, first peak 700 is typically a very narrow peak that has a width of much less than one nanometer, whereas the other peaks typically have bandwidths in the range of 1 to 5 nm each because they are broadened by the SRS process. Overall, FIG. 7 shows that a square input pulse can be used to generate only green when it is at a specific pulse intensity.

Figure 8:
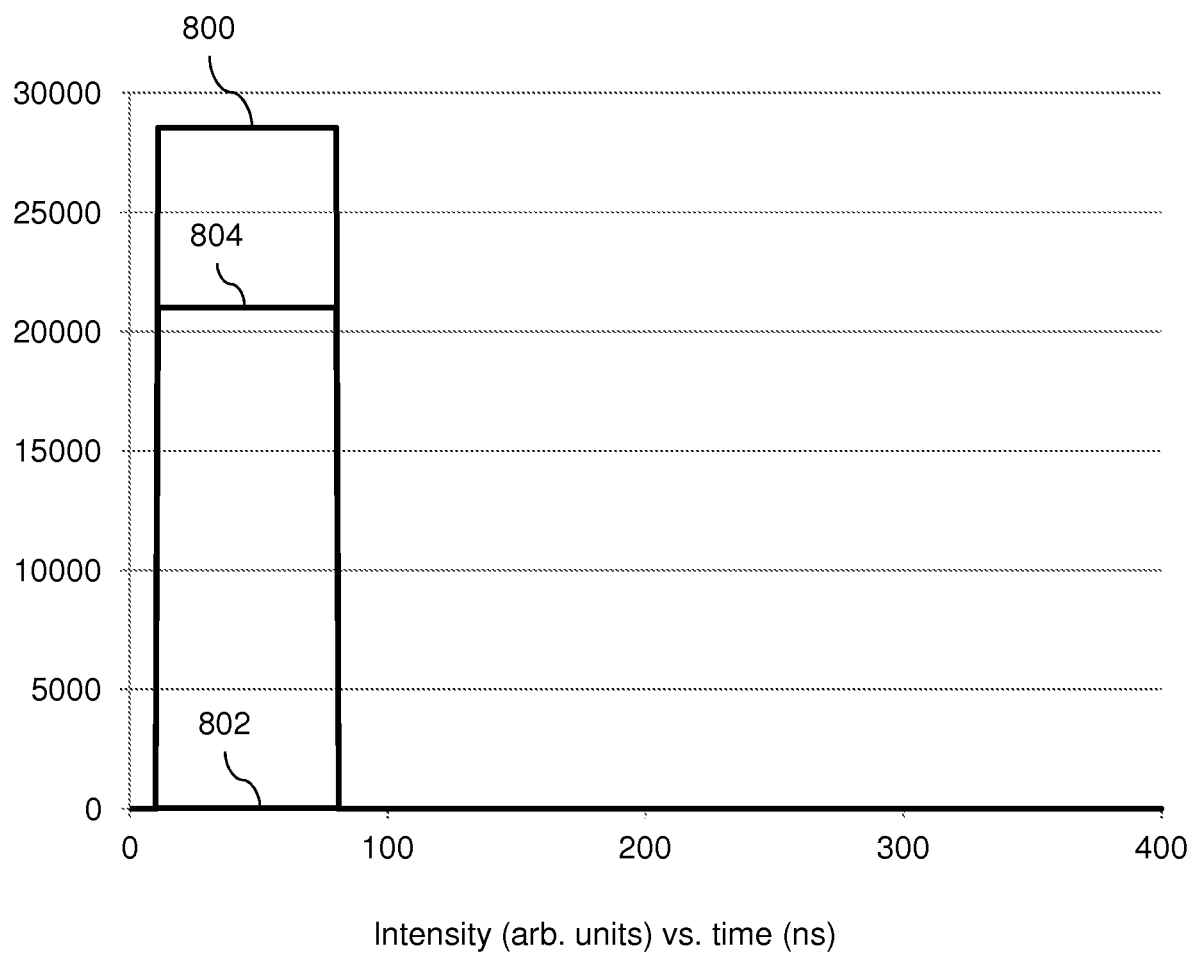
FIG. 8 is a computer-simulated time graph of stimulated Raman scattering from a square pulse generating red stimulated-Raman-scattering light in a KGW crystal.

FIG. 8 shows a computer-simulated time graph of SRS from a square pulse generating red SRS light in a KGW crystal. The same computer model was utilized with the same parameters as for FIG. 2 except that the pulse shape was changed, the input pulse full-width was 70 ns, and the laser pulse energy was $2 \times 10^{-3}$ joules. The x-axis represents time in nanoseconds, and the y-axis represents intensity in arbitrary units. First curve 800 shows the input pulse that has a square-wave shape. Second curve 802 shows a very small amount of energy that is not Stokes shifted or is shifted into the first, second, and third Stokes peaks. Third curve 804 shows the fourth Stokes-shifted peak. Overall, FIG. 8 describes the evolution in time of the SRS process.

Figure 9:
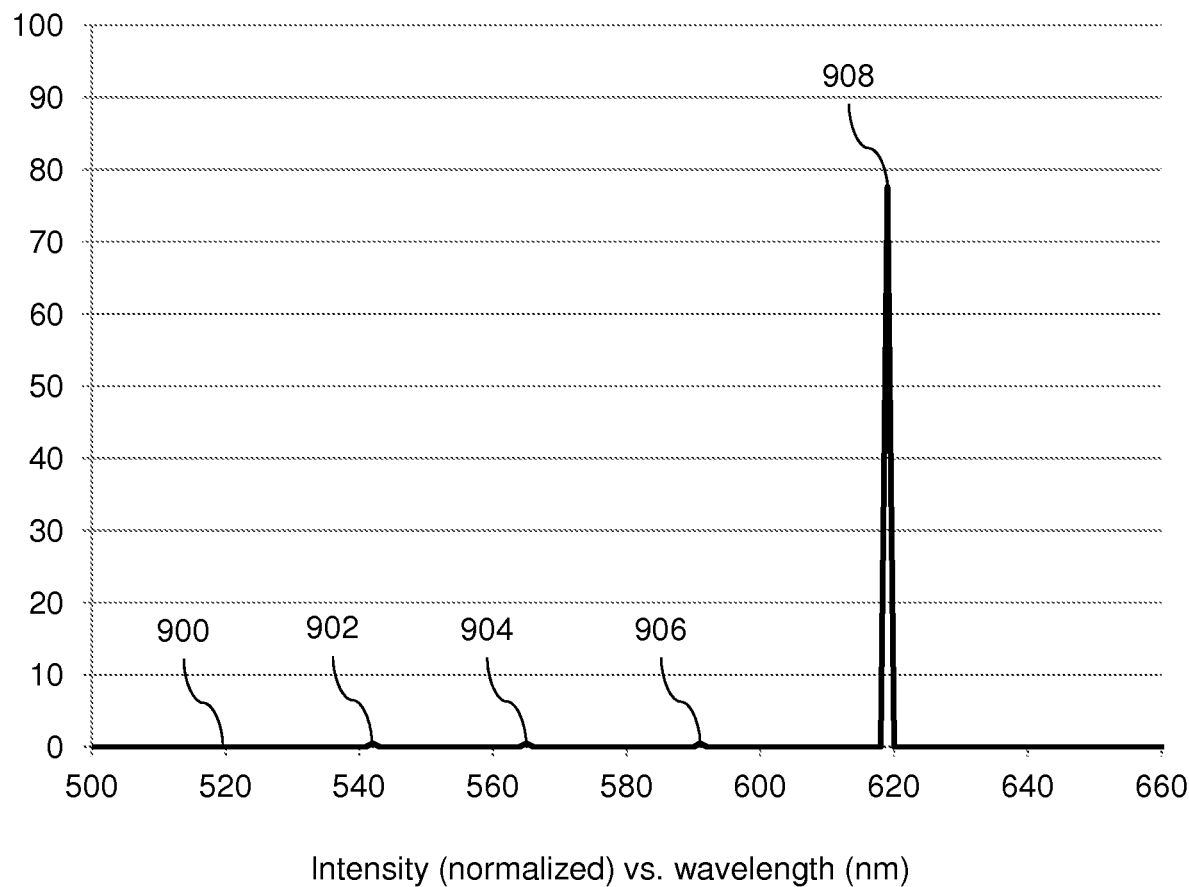
FIG. 9 is a computer-simulated spectral graph of stimulated Raman scattering from a square pulse generating red stimulated-Raman-scattering light in a KGW crystal.

The model used to generate FIG. 8 was used with the same parameters to generate FIG. 9 which shows a computer-simulated spectral graph of SRS from a square pulse generating red SRS light in a KGW crystal. The horizontal axis represents wavelength in nanometers and the vertical axis represents normalized light intensity. First peak 900 shows the spectral position of the pump light used to pump the crystal at 520 nm. Because the pump light is efficiently converted by the Raman process, the residual pump light is not visible as a significant peak in FIG. 9. Second peak 902 shows a very small first Stokes-shifted peak at 542 nm. Third peak 904 shows a very small second Stokes-shifted peak at 565 nm. Fourth peak 906 shows a very small third Stokes-shifted peak at 591 nm. Fifth peak 908 shows a large fourth Stokes-shifted peak at 619 nm. Although not shown to scale in FIG. 9, first peak 900 is typically a very narrow peak that has a width of much less than one nanometer, whereas the other peaks typically have bandwidths in the range of 1 to 5 nm each because they are broadened by the SRS process. Overall, FIG. 9 shows that a square input pulse can be used to generate only red when it is at a specific pulse intensity.

By utilizing alternating pulses between the case shown in FIG. 6 and FIG. 8, alternating green and red light may be generated as shown in FIG. 7 and FIG. 9 and the alternating green and red light can be efficiently synchronized with a digital projector to generate full-color images as shown in FIG. 1. The pulse intensities in FIG. 6 and FIG. 8 have been selected to achieve a green-to-red intensity ratio of approximately 1.2. This ratio approximately meets the white point requirements of the Digital Cinema Initiative (DCI) after the appropriate amount of blue light at 462 nm. The projector transmission was assumed to be spectrally flat in this example, but the green-to-red ratio may be adjusted to compensate for the actual projector transmission if desired.

Figure 10:
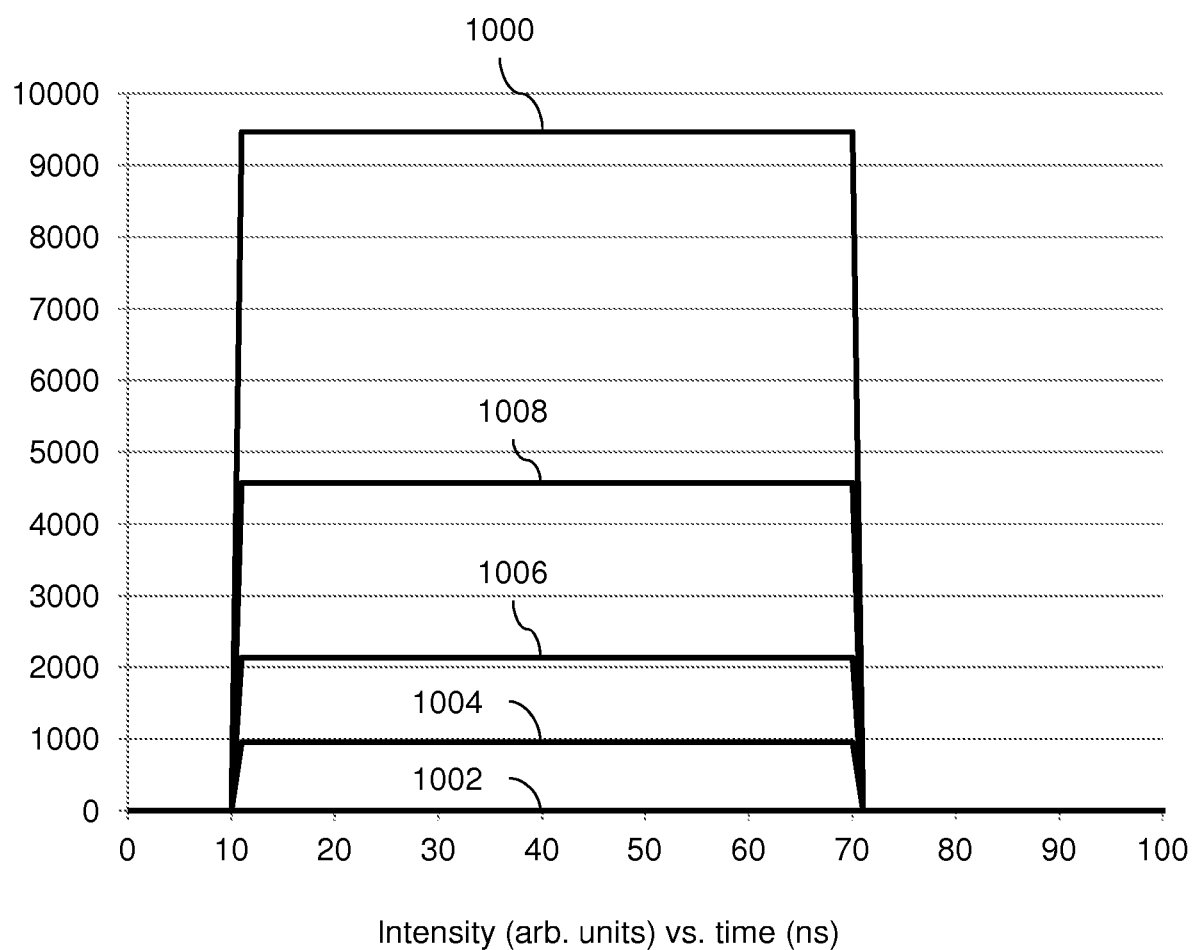
FIG. 10 is a computer-simulated time graph of stimulated Raman scattering from a square pulse in a multimode fiber.

FIG. 10 shows a computer-simulated time graph of SRS from a square pulse in a multimode fiber. The same computer model was utilized as for FIG. 8 except that the Raman shifting device was a multimode optical fiber rather than a KGW crystal, and the input pulse full-width was 60 ns. The x-axis represents time in nanoseconds, and the y-axis represents intensity in arbitrary units. First curve 1000 shows the input pulse that has a square-wave shape. Second curve 1002 shows a very small amount of energy that is not Stokes shifted or is shifted into the third, fourth, fifth, and sixth Stokes peaks. Third curve 1004 shows the first Stokes-shifted peak. Fourth curve 1006 shows the second Stokes-shifted peak. Fifth curve 1008 shows the seventh Stokes-shifted peak. Overall, FIG. 10 describes the evolution in time of the SRS process.

Figure 11:
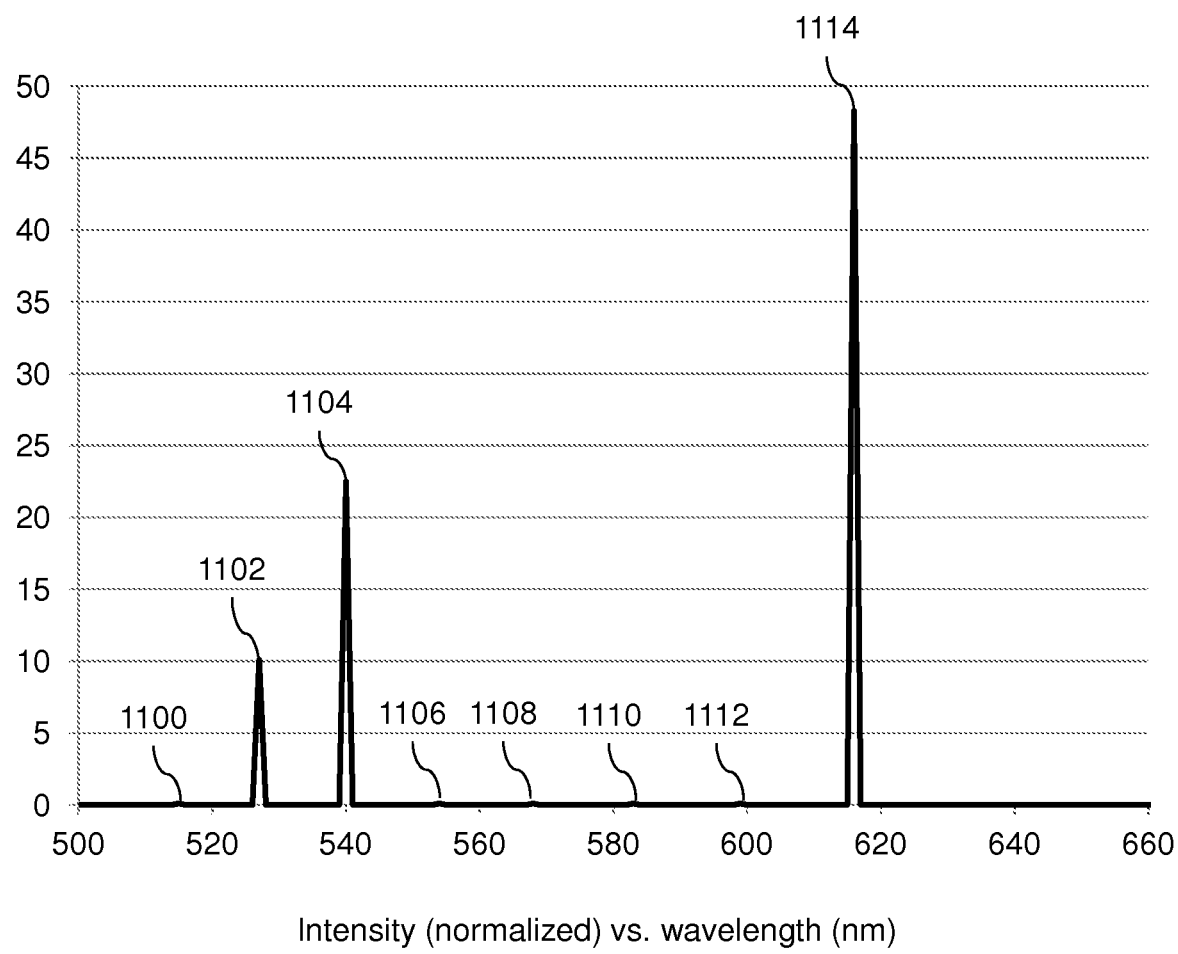
FIG. 11 is a computer-simulated spectral graph of stimulated Raman scattering from a square pulse in a multimode fiber.

The model used to generate FIG. 10 was used with the same parameters to generate FIG. 11 which shows a computer-simulated spectral graph of SRS from a square pulse in a multimode fused-silica optical fiber. The horizontal axis represents wavelength in nanometers and the vertical axis represents normalized light intensity. First peak 1100 shows the spectral position of the pump light used to pump the crystal at 515 nm. Because the pump light is efficiently converted by the Raman process, the residual pump light is not visible as a significant peak in FIG. 11. Second peak 1102 shows a first Stokes-shifted peak at 527 nm. Third peak 1104 shows a second Stokes-shifted peak at 540 nm. Fourth peak 1106 shows a very small third Stokes-shifted peak at 554 nm. Fifth peak 1108 shows a very small fourth Stokes-shifted peak at 568 nm. Sixth peak 1110 shows a very small fifth Stokes-shifted peak at 583 nm. Seventh peak 1112 shows a seventh Stokes-shifted peak at 599 nm. Eighth peak 1114 shows a very small sixth Stokes-shifted peak at 616 nm. Although not shown to scale in FIG. 11, first peak 1100 is typically a very narrow peak that has a width of much less than one nanometer, whereas the other peaks typically have bandwidths in the range of 1 to 5 nm each because they are broadened by the SRS process. Overall, FIG. 11 shows that a square input pulse in a fused silica optical fiber can be used to generate green and red light that meet the color requirements of the DCI standard while not generating light in the gap between the two colors. The light in the gap is yellow light that generally does not have high transmission through a digital projector.

Figure 12:
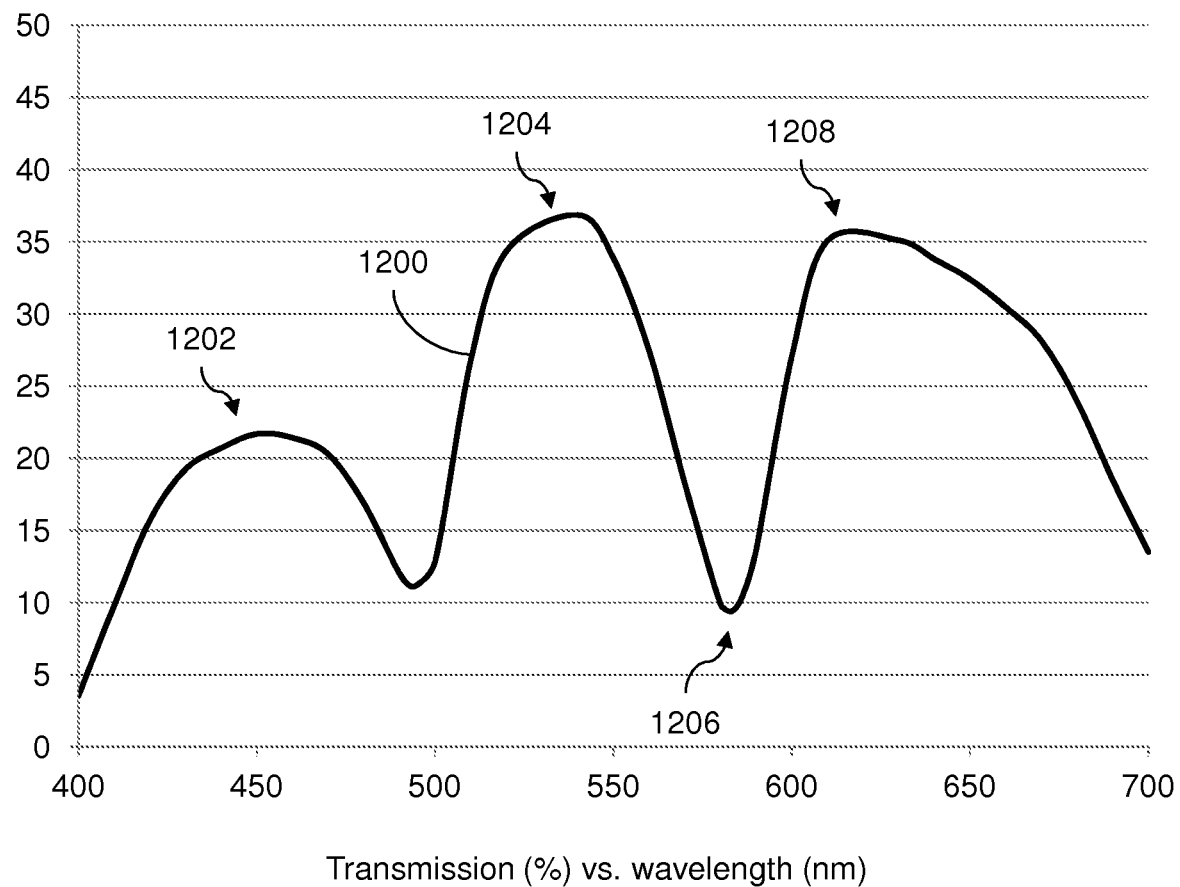
FIG. 12 is a spectral graph of transmission through a projector.

FIG. 12 shows a spectral graph of transmission through a projector. The horizontal axis represents wavelength in nanometers and the vertical axis represents light transmission through a typical digital cinema projector. Curve 1200 shows the variation of light transmission through the projector with wavelength. First region 1202 shows the transmission for blue light. Second region 1204 shows the transmission for green light. Third region 1208 shows the transmission for red light. Fourth region 1206 shows the transmission for yellow light. The transmission of blue, green, and red light is much higher than the transmission of yellow light. The reduction in yellow light is generally necessary to meet the DCI color requirements for the green and red primary colors. By generating a despeckled laser spectrum that avoids or reduces the amount of yellow light, the transmission of laser light through the projector is improved.

Figure 13:
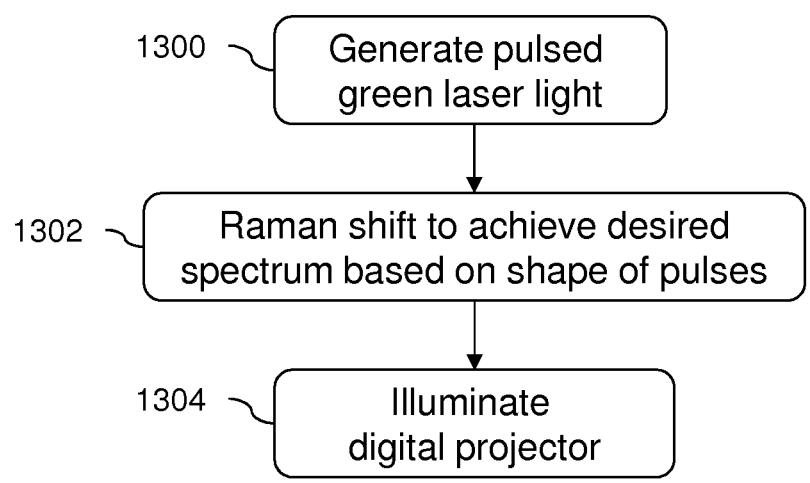
FIG. 13 is a flowchart of a method of laser projection with spectral control of Raman despeckling.

FIG. 13 shows a flowchart of a method of laser projection with spectral control of Raman despeckling. In step 1300, pulsed green laser light is generated. In step 1302, SRS is used to achieve a desired spectrum based on the shape of the pulses. In step 1304, the SRS light is used to illuminate a digital projector.

Figure 14:
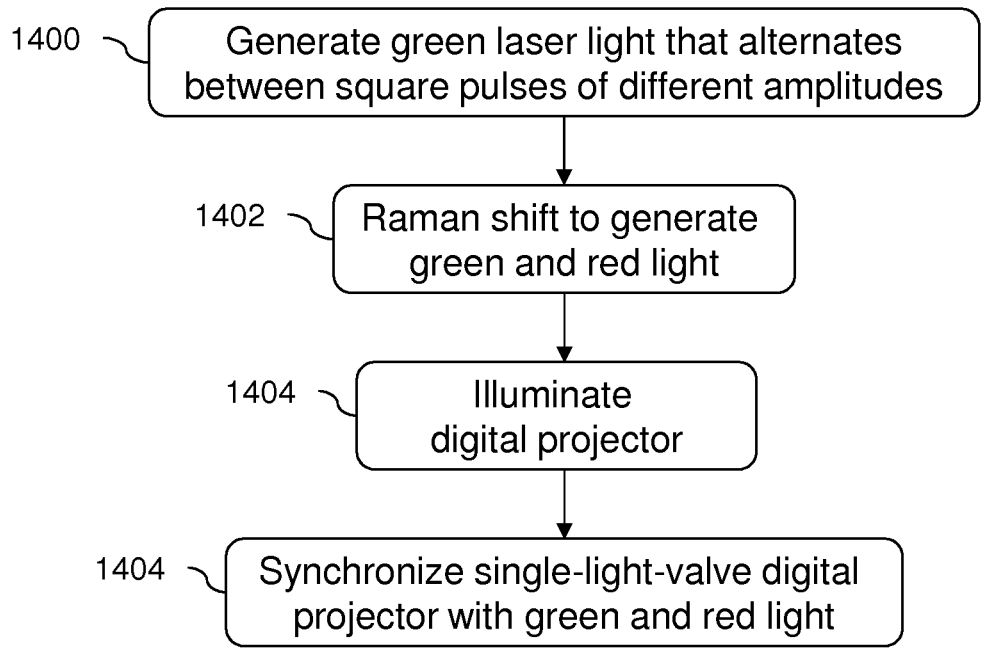
FIG. 14 is a flowchart of a method of laser projection with spectral control of Raman despeckling that alternates between green and red.

FIG. 14 shows a flowchart of a method of laser projection with spectral control of Raman despeckling that alternates between green and red. In step 1400, pulsed green laser light is generated that alternates between square pulses of different amplitudes. In step 1402, SRS is used to alternately generate green light and red light. In step 1404, the SRS light is used to illuminate a digital projector. In step 1404, a single-light-valve digital projector is synchronized with the alternating green and red light.

Figure 15:
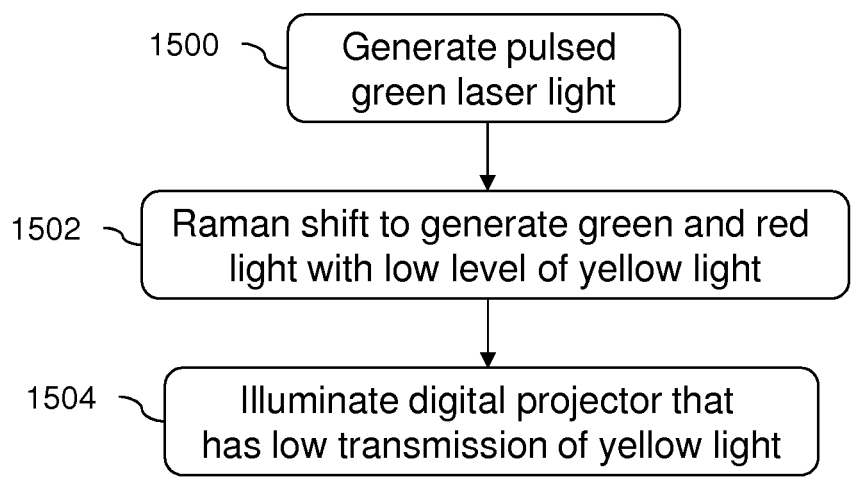
FIG. 15 is a flowchart of a method of laser projection with spectral control of Raman despeckling that generates a low level of yellow light.

FIG. 15 shows a flowchart of a method of laser projection with spectral control of Raman despeckling that generates a low level of yellow light. In step 1500, pulsed green laser light is generated. In step 1502, SRS is used to generate green and red light with a gap between that has a low level of yellow light. In step 1504, the SRS light is used to illuminate a digital projector that has a low transmission of yellow light.

The computer model utilized to calculate the SRS light in a KGW crystal or multimode optical fiber can be used to optimize the Raman conversion process and transfer of power in the series of cascaded Raman shifts to longer wavelengths. This enables design of a system that efficiently converts power to higher-order Stokes peaks. It also enables the calculation of the spectral output behavior of the system. This can be utilized to provide a spectrum that is controlled to meet the requirements specific applications such as the DCI specification. This model is a simplification of the general problem of nonlinear processes in crystals. It does not account for four wave mixing effects for example. However the results of the model are in general agreement with experimentally determined results.

KGW is a biaxial crystal with Raman shifts that are dependent on polarization orientation. The Raman shift is either 768 $cm^{-1}$ or 901 $cm^{-1}$. The 768 $cm^{-1}$ shift is advantageous for despeckling because minimal peak spacing enables the maximum number of peaks to fit into the visible bands in order to achieve maximum despeckling. The crystal is typically cut to allow propagation along the b-axis. The output wavelength from the Raman crystal may be controlled by an optical waveplate that controls the polarization orientation of the pump laser beam. Other crystals may be used instead of KGW for the Raman conversion process.

Pulsed green laser sources with high peak power may be used to pump the KGW crystal, multimode fiber, or other material that makes SRS light. The pulsed green laser source may be constructed by utilizing a solid-state laser that includes a neodymium or ytterbium-doped crystal (such as yttrium aluminum garnet, vanadate or yttrium lithium fluoride) to provide an infrared (IR) laser beam at a wavelength of approximately one micron and a nonlinear crystal (such as lithium triborate) to convert the laser energy from IR to green. Green light is generally accepted to be in the wavelength range of 510 nm to 560 nm. Red light is generally accepted to be in the wavelength range of 600 nm to 700 nm.

For multimode optical fibers, the Raman-shifting KGW computer model discussed above may be utilized after adding modifications to include the effects of multiple fiber modes. The model simulates the Raman conversion properties of a multimode optical fiber with a pulsed laser beam pump that creates Raman gain in the crystal to produce first, second and up to seventh Stokes-shifted light peaks. It incorporates several parameters of the fused-silica material and the laser source to calculate the Stokes-shifted beams. These parameters include: Raman gain cross section, fiber core diameter, fiber length, fiber optical loss, laser input power, pump-laser-pulse temporal profile, spontaneous Raman signal level, and quantum defect level.

The distribution of power in the fiber waveguide modes is important to modeling the Raman processes in multimode fiber. The key issue is the coupling of power from a launched mode to higher order modes as the input pulse propagates through the fiber. The overlap integrals for several higher order modes can be calculated using a Bessel function analysis. These were calculated for a circular, step-index profile. The input laser pump launch power is predominantly in the LP01 mode. This power is then distributed to higher order modes as the laser pulse propagates along the fiber. The coupling in the higher order modes can be treated as a series of groups of coupled modes. The power ratio between modes can be calculated and the Raman gain for a specific fiber mode or group of modes can be calculated. The evolution of several Raman spectra from multiple modes can then be computed.

The parameters used for the multimode-fiber computer simulation in FIG. 10 and FIG. 11 are as follows: the Stokes shift was 455 $cm^{-1}$, the Raman gain cross section was $1.4 \times 10^{-13}$ m/W, the fiber core diameter was 50 micrometers, the laser pulse energy was $2 \times 10^{-3}$ joules, the fiber length was 50 m, the spontaneous Raman seed power was $1 \times 10^{-7}$ W, the quantum defect level was 0.97, and the fiber transmission was 99.9% $m^{-1}$. The computer model can be used to study the trade space of fiber length, pump pulse laser energy, pulse profile in time, and pulse duration. This can be used to optimize the SRS conversion process and transfer of power in a series of cascaded Raman shifts to longer wavelengths. This enables design of a system that efficiently converts power to higher Stokes orders. It also enables a study of the spectral output behavior of the system, and can be utilized to provide a resultant color condition that is controlled to meet the requirements for DCI specifications. The multimode-fiber computer model is in general agreement with experimentally determined results.

In addition to Gaussian, exponential decay, and square pulses discussed above, other pulse shapes may be utilized to make a variety of SRS spectrums. For example, exponential rise, stairstep, triangle, and other shapes may be useful in various projection system designs.

Other implementations are also within the scope of the following claims.

What is claimed is:

1. An optical apparatus comprising:
a pulsed green laser;
a Raman-shifting device; and
a digital projector;
wherein the pulsed green laser generates a green light with a light pulse that illuminates the Raman-shifting device; the light pulse is shaped in a time domain to generate a desired spectrum from the Raman-shifting device, and the desired spectrum illuminates the digital projector.

2. The apparatus of claim 1 wherein the desired spectrum has a lower speckle characteristic than the green light.

3. The apparatus of claim 1 wherein the desired spectrum has a higher luminous efficacy than the green light.

4. The apparatus of claim 1 wherein the light pulse is shaped in the time domain to be a square shape.

5. The apparatus of claim 4 wherein the desired spectrum is red.

6. The apparatus of claim 5 wherein the light pulse is shaped in the time domain to alternate between a square shape of a first amplitude and a square shape of a second amplitude; the first amplitude is different than the second amplitude; and the desired spectrum alternates between green light and red light.

7. The apparatus of claim 6 wherein the digital projector comprises a single light valve; and the single light valve forms a full color digital image by synchronizing the single light valve with a source of blue light and with the desired spectrum that alternates between green light and red light.

8. The apparatus of claim 1 wherein the desired spectrum comprises a green band and a red band; and the desired spectrum has a gap between the green band and the red band.

9. The apparatus of claim 8 wherein the gap matches a low transmission band of the digital projector.

10. A method of despeckling comprising:
    generating a pulsed green laser light;
    Raman-shifting the pulsed green laser light to generate a Raman-shifted laser light;
    using the Raman-shifted light to illuminate a digital projector; and
    projecting a digital image with the digital projector;
    wherein the pulsed green laser light has a light pulse that is shaped in a time domain to Raman-shift the laser light to a desired spectrum.

11. The method of claim 10 wherein the desired spectrum has a lower speckle characteristic than the pulsed green laser light.

12. The method of claim 10 wherein the desired spectrum has a higher luminous efficacy than the pulsed green laser light.

13. The method of claim 10 wherein the light pulse is shaped in the time domain to be a square shape.

14. The method of claim 13 wherein the desired spectrum is red.

15. The method of claim 14 wherein the light pulse is shaped in the time domain to alternate between a square shape of a first amplitude and a square shape of a second amplitude; the first amplitude is different than the second amplitude; and the desired spectrum alternates between green light and red light.

16. The method of claim 15 wherein the digital projector comprises a single light valve; and the single light valve forms a full color digital image by synchronizing the single light valve with a source of blue light and with the desired spectrum that alternates between green light and red light.

17. The method of claim 10 wherein the desired spectrum comprises a green band and a red band; and the desired spectrum has a gap between the green band and the red band.

18. The method of claim 17 wherein the gap matches a low transmission band of the digital projector.

* * * * *

UNITED STATES PATENT AND TRADEMARK OFFICE
CERTIFICATE OF CORRECTION

| | | |
|---|---|---|
| PATENT NO. | : 10,663,747 B2 | Page 1 of 1 |
| APPLICATION NO. | : 15/357320 | |
| DATED | : May 26, 2020 | |
| INVENTOR(S) | : Ian Lee, Barret Lippey and John Arntsen | |

It is certified that error appears in the above-identified patent and that said Letters Patent is hereby corrected as shown below:

On the Title Page

Under Item (72) Inventors:
Please delete "Amsten", and insert --Arntsen--.

Signed and Sealed this
Twenty-first Day of July, 2020

Andrei Iancu
*Director of the United States Patent and Trademark Office*